United States Patent [19]

Machurat et al.

[11] 4,185,001

[45] Jan. 22, 1980

[54] PROCESS FOR PREPARING PLASTIC COMPOSITIONS CONTAINING A SILICATE DISPERSED THEREIN

[75] Inventors: Jean Machurat, Neuville sur Saone; Georges Vrisakis, Collonges-au-Mont-D'Or, both of France

[73] Assignee: Rhone-Poulenc Industries, Paris, France

[21] Appl. No.: 855,077

[22] Filed: Nov. 28, 1977

[30] Foreign Application Priority Data

Nov. 29, 1976 [FR] France .................... 76 35883

[51] Int. Cl.$^2$ .................... C08K 3/10; C08K 3/30
[52] U.S. Cl. .................... 260/42.37; 260/23.7 M; 260/42.13; 260/746; 260/821
[58] Field of Search ............ 260/42.37, 42.13, 23.7 M, 260/821, 746, 746 WG

[56] References Cited

U.S. PATENT DOCUMENTS

| | | | |
|---|---|---|---|
| 1,970,469 | 8/1934 | Murphy | 260/739 |
| 2,171,552 | 9/1939 | Hauser | 260/746 |
| 2,485,287 | 10/1949 | Henson et al. | 260/42.37 |
| 2,948,701 | 8/1960 | Baker et al. | 260/821 |
| 2,972,594 | 2/1961 | Baker et al. | 260/746 |

*Primary Examiner*—Ronald W. Griffin
*Attorney, Agent, or Firm*—Burns, Doane, Swecker & Mathis

[57] ABSTRACT

Silica plastic compositions containing a silicate filler finely dispersed therein are produced by simultaneously adding a mixture of an aqueous solution of an alkali silicate and a coagulable latex emulsion of a plastic polymeric material and a solution of at least one salt of hydrochloric or sulfuric acids and a metal selected from the group consisting of zinc, magnesium, calcium, and maintaining the pH of the reaction medium at a level appropriate for the precipitation of the neutral silicate of the metal, yet at which precipitation of either hydroxy salts of the metal or of alkaline silicates is substantially precluded.

22 Claims, No Drawings

PROCESS FOR PREPARING PLASTIC COMPOSITIONS CONTAINING A SILICATE DISPERSED THEREIN

BACKGROUND OF THE INVENTION

1. Field of the Invention

The present invention relates to processes for the preparation of silicate charges containing plastic compositions, a polymeric composition containing silicate charges in particular, master batches, by co-precipitation techniques. The present invention also relates to the silicate containing plastic compositions resultant from the co-precipitation process.

2. Description of the Prior Art

The art of reinforcing elastomeric materials has actively pursued methods and materials for effectively incorporating white fillers or charges within an elastomeric composition. Primary emphasis has been laid on the incorporation of silica as such a charge or filler material. Conventionally, the charge is added to or formed within a mixture which is to be vulcanized subsequent to the incorporating of the charge therein. While this facilitates control of the formation of the set charge, unfortunately control of the incorporation of the charge into the resulting vulcanized elastomer is quite difficult.

It has also been proposed to use mixtures of a charge and an elastomer; however, heretofore this approach has resulted only in the coating of the silica agglomerates, but not in formation of aggregates. "Co-precipitation" of silica or silicates and a rubber latex have been examined in an effort to provide a useful product. Yet major difficulties are encountered in arriving at a homogeneous precipitation of the latex and the filler charge. This is due to the fact that the reference to "co-precipitation" is, technically, a misnomer. In effect, if the reaction is effected by simply adding an acid to the mixture of the latex and a soluble silicate, silica will precipitate gradually over the pH range of from about 3 to about 10, while the latex emulsion does not break down until a pH on the order of 5 is achieved. Therefore, there is not, in actuality, a simultaneous precipitation of silica accompanied by coagulation of latex. However, because the art speaks in terms of "co-precipitation", the present specification will do so likewise.

The impetus for activity in the investigation of co-precipitation of silica or silicates and rubber latex regards the desire to obtain homogenous precipitation, whereby silica- or silicate-containing master batches may be prepared for ease of incorporation of the charge within an elastomeric material. To date, however, none of the prior art processes directed to this end have resulted in the ability to obtain a good dispersion of the charge within the elastomer.

It has been proposed, in U.S. Pat. No. 2,485,287, to admix a dilute coagulable aqueous dispersion of polymeric materials with a dilute aqueous solution of a water-soluble chemical reagent which has substantially no coagulating action on the dispersion, and introducing an aqueous solution of a second water-soluble chemical reagent which is reactive with the first in the formation of insoluble materials and which also is capable of coagulating the dispersion. According to this patented procedure, the coagulating reagent must be supplied in excess amounts over that necessary to bring about reaction with the first reagent if coagulation is to proceed. It is obvious that the procedure, in accordance with this method, is complicated, and requires a great many precautions to yield a serviceable product. Additionally, the present inventors have determined that processes such as this have many critical parameters, particularly pH, which must be followed closely if the process is to work at all.

The art also recognizes, as a general matter, various processes for precipitating or coagulating dispersions of rubber or similar types of material. Along these lines, note U.S. Pat. No. 1,970,469 which discloses the double decomposition of one or more water-soluble reagents having normally no coagulating effects upon rubber-containing dispersions with one or more water-soluble reagents capable of reacting with the first to produce insoluble compounding ingredients. Carbonates, sulfates, silicates of the alkali metals or of ammonium are noted as examples of the first water-soluble reagents; while, soluble salts of magnesium, aluminum, calcium, barium, or zinc are noted as useful for the second enumerated water-soluble reagents.

Accordingly, the need exists to provide an improved filler or charge material, based upon silica-latex mixtures, for incorporation in elastomeric materials. The need also exists to provide an improved, simplified, and more efficient process for the production of these products.

SUMMARY OF THE INVENTION

In accordance with the foregoing, it is a primary object of the present invention to provide a process which leads to a homogenous incorporation of charge or filler based upon silicates in an elastomeric material.

Another primary object of the present invention is to provide a simplified, efficient, and commercially practicable method for producing silicate containing master batches for use in the manufacture of elastomeric materials.

It is a further object of the present invention to provide such a process by which a particularly fine and homogenous dispersion of the silicate charge throughout the elastomer and/or the plastic precursor composition, e.g., a master batch is achieved.

It is a further object of the present invention to provide a process wherein no excess of the metal component is needed in addition to the necessary amount for producing the metal silicate charge.

In order to accomplish the foregoing objects according to the present invention there is provided a process for preparing plastic composition comprising a plastic organic polymeric material containing finely dispersed therein a water-insoluble inorganic silicate comprising the steps of:

(a) Feeding a stream of an aqueous mixture containing a coagulable latex dispersion of a plastic organic polymeric material and an aqueous solution of a water-soluble alkali silicate into a reactor simultaneously with a separate stream of an aqueous solution containing at least one water-soluble bivalent metal salt selected from the group consisting of chlorides and sulfates of a bivalent metal cation selected from the group of zinc, magnesium and calcium cation, to form a reaction slurry the pH of which is constantly maintained at such a value as is appropriate for precipitating a substantially neutral silicate of said bivalent metal by reaction of stoichiometrically equivalent amounts of the alkali silicate and the bivalent metal salt, yet at which the precipitation of any hydroxy salt of the bivalent metal and of any alkali silicate is substantially prevented thereby maintaining a sufficiently elevated reaction temperature to effect the precipitation of the neutral bivalent metal silicate and the coagulation of the polymeric material to form a suspension of particles of said organic polymeric material having said bivalent metal silicate associated therewith, and (b) recovering said particles from said suspension.

The reaction temperature is preferably maintained in the range of from about 40° to about 90° C. The two streams of reactants may be simultaneously introduced into water or an aqueous electrolyte solution contained in the reactor.

The pH value of the reaction medium may vary depending on which of the bivalent metal cations are present, and on the reaction conditions, such as the reaction temperature and the type of any other electrolytes which may be present in the reaction medium. Usually a pH value within the range of from about 6.0 to about 10.0 is suitable. Yet in each case the pH value has to be chosen at a level, and to be constantly maintained at this level, where substantially only the neutral bivalent metal silicate is precipitated in a stoichiometric reaction according to the following empirical equation:

$$A_2O \cdot xSiO_2 + MeY \rightarrow MeO \cdot xSiO_2 + A_2Y$$

wherein A represents an alkali me-al, preferably sodium, Me represents zinc calcium or magnesium, x represents the molar ratio $SiO_2/MeO$ in the precipitated metal silicate and has a value from about 1 to about 4, preferably from about 2 to about 3.5 and y represents sulfate or dichloride or nitrate.

It is an important feature of the process according to the present invention that the pH value of the reaction mixture is adjusted within such limits, that the precipitation of any other inorganic compounds is avoided, that is the pH value must be sufficiently high that the precipitation of any alkali silicates or silicic acid is substantially precluded, yet it must be sufficiently low to preclude the precipitation of any hydroxy salts of the bivalent metal such as MeOHCl or $(MeOH)_2SO_4$. Further, according to the present invention, there is provided a plastic composition which comprises coagulated particles of the plastic organic polymers including inorganic solids which are the reaction product of a reaction between stoichiometrically equivalent amounts of a bivalent metal salt and an alkali silicate according to the above equation.

DETAILED DESCRIPTION OF THE INVENTION

In order to more fully elucidate upon the various objects and advantages of the present invention, the following detailed description will be given in terms of various preferred embodiments thereof and exemplified with respect thereto. However, the same are intended as illustrative and in no wise limitative.

The process for preparing silicate containing master batches for plastic compositions in accordance with the present invention may be characterized, in its most essential aspects, as a co-precipitation between a mixture of an aqueous solution of an alkaline silicate and a latex-containing suspension, and a solution of at least one salt of hydrochloric and sulfuric acids and a bivalent metal cation selected from the group consisting of zinc, magnesium, and calcium cations. In order to provide the objects and advantages of the present invention, the pH of the reaction slurry is maintained, pragmatically, at a level to cause precipitation of the neutral silicate of the metal, only, while substantially preventing precipitation of either the basic salts of the bivalent metal cation or alkaline silicates. In a preferred embodiment, the mixture and the solution are simultaneously added to a reaction bed or zone which contains water. In another variation of the present invention, the reactor bed or zone contains a solution of an electrolyte. In such an event, the electrolyte preferably comprises a salt, the anion of which corresponds to that of the bivalent metal salt, i.e., a chloride and/or a sulfate. Furthermore, it is sometimes advantageous to add an acid to the reaction zone, the anion of which corresponds to that of the bivalent metal.

Depending upon the metal constituent which is used in the bivalent metal salt solution the pH of the reaction medium the pH necessary to cause precipitation of the neutral silicate, while substantially precluding precipitation of either any basic salts of the metal or any alkaline silicate, will vary. As a practical matter, when the bivalent metal salt is a zinc salt, the pH should vary between about 6.0 and about 6.5; when the bivalent metal salt is a magnesium salt, the pH should be maintained between about 8 and about 9.5; and, when the bivalent metal salt is a calcium salt, the pH should be maintained between about 8.5 and about 10. However, the skilled artisan will recognize that these ranges are not absolute and might be altered, especially in the event an electrolyte is added to the solution or by the temperature.

In a particularly preferred embodiment, the alkaline silicate employed is a sodium silicate wherein the molar ratio $SiO_2/Na_2O$ ranges between about 2 and about 3.5. It is advisable to adjust the concentration of silicate in the mixture containing the silicate solution and the latex dispersion and the concentration of bivalent metal salt in the bivalent metal salt solution and the feeding rate of the two separate streams into the reactor in such a manner that always substantially stoichiometrically equivalent amounts of alkali silicate and bivalent metal salt are simultaneously introduced into the reactor.

The silicate concentration in the silicate solution preferably is equivalent to an amount of from 25 to 75 g/l of $SiO_2$ and from about 7.4 to about 39 g/l of $Na_2O$.

The process according to the present invention can be used to incorporate silicates into a wide variety of organic plastic polymer material, e.g., any plastics which are conventionally used in the rubber industry. Thus, any of the natural rubbers or resins in the form of naturally occurring or artificially prepared aqueous dispersions may be used; any of the synthetic rubber latices such as those prepared by the copolymerization of butadiene-1,3 and styrene, but preferably those polymers having a butadiene-styrene ratio of one part of butadiene-1,3 to one-tenth to two parts of styrene; synthetic rubber latices prepared by substituting all or part of the butadiene-1,3 with other butadiene-1,3 hydrocarbons, such as isoprene, 2,3-dimethyl butadiene-1,3, piperylene 3-methyl-pentadiene-1,3 or with substituted aliphatic conjugated dienes such as 2-chloro-butadiene-1,3 and others; synthetic rubber latices prepared by substituting all or a part of the styrene with other organic compounds containing single olefinic double bond, and which are well known to be copolymerizable with butadiene-1,3 hydrocarbons such as acrylonitrile, methyl methacrylate, chlorostyrenes and the like; any of the aqueous dispersions produced by emulsion polymerization (or produced from a solid polymer by artificial means) of the chloroethylenes containing from one to two chlorine atoms on one only of the carbon atoms such as vinyl chloride and vinylidene chloride, either singly or in combination with other such chloroethylenes and/or copolymerized with one or more other monomeric materials copolymerizable therewith such as methyl and ethyl acrylate, styrene and others; aqueous dispersions of such polymers as polymerized methyl and ethyl acrylate and methacrylate, polystyrene, polyisobutylene and copolymers of isobutylene with other materials, polyethylene and the like, polyvinyl acetate, polyalkylene polysulfides, and the like; and aqueous dispersions of synthetic polymeric resinous materials such as the fusible phenol-formaldehyde resins and the fusible urea-formaldehyde resins and the like. In short, any aqueous dispersion of an organic polymeric material in the plastic condition (which may or may not require the presence of plasticizer) may be used in the method of this invention. Suitable are aqueous dispersions of the plastic rubber-like materials including the natural rubbers such as hevea, balata, guttapercha, guayule, and other naturally occurring gums; aqueous dispersions of the diene synthetic rubbers enumerated hereinabove; and aqueous dispersion of the synthetic resins which are rubber-like such as plasticized polyvinyl chloride, plasticized copolymers of vinyl chloride with other materials, and in addition other rubber-like materials such as polyalkyl acrylates, polyalkylene polysulfides, and the like, polyisobutylene, and copolymers of isobutylene with other materials, etc. Particularly suitable are aqueous dispersions of the vulcanizable rubber-like materials such as the natural rubbers already enumerated, the sulfur vulcanizable synthetic rubber-like materials including the polymers of the butadiene-1,3 hydrocarbons, either alone or with monomeric materials well known to be copolymerizable therewith; and other sulfur vulcanizing rubber-like materials such as the polyalkylene polysulfides, and others. Moreover, rubber-like materials such as polymerized 2-chloro-butadiene-1,3, known commercially as the neoprene type synthetic rubber which are vulcanizable or curable by means of a vulcanizing agent are also useful. Especially preferred rubber-like plastic materials within the present invention are plastic polymers of the type of styrene-butadiene rubbers. The quantity of polymer contained in the latex dispersion should be between about 75 and 250 g/l.

The coagulated particles of polymeric plastic material containing the bivalent metal silicate can be separated from the final suspension resulting from the above reaction in any conventional manner. For example the suspension may be filtered and the thus recovered solid product be washed in a conventional procedure as is usually carried out for recovering a precipitated silicate from a suspension. The thus recovered still water containing cake is then dried in a conventional manner at a temperature of below 130° C. The drying may be effected by spray-drying in an appropriate spray dryer or preferably in a dryer as is described in the following example.

Accordingly, the process for producing the silicate containing plastic compositions of the present invention is quite simple as compared with prior art processes, and yet efficiently provides a product which is better adapted for use in the manufacture of elastomeric materials. That is, the silicate charge obtained in accordance with the present invention exhibits a remarkably better dispersion in the vulcanized product.

The inorganic solid silicate which, according to the process of the present invention, is incorporated into the plastic composition is an amorphous product, as has been proven by X-ray determination. The molar ratio Si/Me within the metal silicate is equivalent to the empirical formula $MeO \cdot xSiO_2$ wherein Me and x are as defined above. Yet the actual product also retains a certain amount of hydroxy groups as can be observed by infrared spectroscopy and as is to be expected for freshly precipitated silicate after submitting it to a drying temperature of below 130° C.

The silicate containing plastic composition according to the present invention may be used as a master batch and be blended with adjuvants and additional plastic materials in a manner well known in the art. In order to prepare vulcanizable and moldable composition adjuvants which are conventionally used in the rubber industry for the formulation of vulcanizable plastic compositions from silica containing rubbers. Among these adjuvants are accelerators and activators such as stearic acid, polyethylene glycol, sulfur and conventionally known vulcanizing agents. Additional plastic organic polymers, e.g., polystyrenes or polystyrene copolymers, may also be formulated with the master batches according to the present invention and further organic or inorganic charges may optionally be added. The vulcanizable plastic compositions obtained from the master batches according to the present invention may be molded and cured into elastomers by processes which are generally known in the art and are usually applied in the rubber industry for the manufacture of elastomers. For example, the molding and curing can be carried out simultaneously or in separate steps. For example, the composition may be molded into a mold under the action of pressure and simultaneously or subsequently cured by means of heat in a compression injection or transfer process. Or the composition may first be molded into the desired shaped article by any known process, e.g., by hand, or by calendering extrusion and may then in an independent procedure, be cured, e.g., in a heated tunnel, oven or autoclave. Elastomeric products usually are prepared from rubber mixtures containing varying amounts of various vulcanizable plastic materials and additives which are chosen according to the desired properties of the final elastomer.

These various ingredients (usually 10 to 25 different components) are blended and homogenized to form a mixture which has the consistency of a relatively viscous mastix and which can then be molded by means of compression molding, injection molding or calendering extrusion.

The raw molded article is then subjected to a temperature which provokes the formation of chemical bridges between the polymer chains by means of a cross-linking agent (usually sulfur) thus limiting the degree of deplacement of the polymer chains. This reaction, which is known as vulcanizing or cross-linking, leads to a transformation from the predominantly plastic state of the raw mixture into a predominantly elastic state of the vulcanized material.

Reinforcing charges such silica or silicates or black carbon are essential components of elastomers which during their intended use are exposed to severe mechanical stresses, such as for example shoe soles, fittings for technical devices or pneumatic tires. Preferably, such charges comprise between 30 and 100 parts per 100 parts of the polymer. These reinforcing charges imply excellent mechanical properties to the elastomer mixture, for example excellent hardness, tensile strength, tear strength, abrasion resistency and the like.

Typical formulation may comprise up to 10–25 ingredients of the following type:

|  | general range | most commonly applied range |
|---|---|---|
| Plastic material (synthetic or natural) | 100 | 100 |
| Additives of the following types | 0 to 300 | 30 to 100 |
| filler ½ reinforcing — charge reinforcing |  |  |
| Plasticizing agent | 0 to 150 | 10 to 50 |
| Oils { Paraffins, Naphthene derivatives, Aromatic compounds such as coumarone } Resins |  |  |
| Zinc oxide } activating agents | 0 to 15 | 3 to 6 |
| Stearic acid | 0 to 5 | 1 to 2 |
| DEG or PEG or TEA (% per amount of the charge)[1] | 0 to 6% | 2 to 4 |
| Accelerating agents | 0.5 to 6 | 1 to 3 |
| Types: |  |  |
| Thiazole (MBTS) |  |  |
| Guanidine (DPG) | Combination of 2–5, preferably 2–3, accelerating agents |  |
| Carbamate (DEDCZn) |  |  |
| Thiuram (DTMT) |  |  |
| Sulfenamide (CBS) |  |  |
| etc. |  |  |
| Cross-linking agents (usually sulfur) | 0.5 to 5 | 0.5 to 3 |

[1] For mixtures containing mineral charges.

These elastomers are suitably prepared according to the following method comprising the following operations:

A. Mixing

Suitably an internal mixer, e.g., a Banbury type or a Werner type mixer, or a roller mixer is used.

Usually ingredients are introduced into the mixture in the following sequence:
(a) plastic material
(b) ⅔ of the filler+ZnO
(c) ⅓ of the charge+stearic acid PEG and the like
(d) accelerators and/or sulfur Mixing time:
internal mixer 3 to 15, preferably 5 to 8 minutes
open mixer 20 to 60, preferably 30 minutes If the mixture is prepared in an internal mixer, it is subsequently treated with the sulfur and/or the accelerators. In an open mixer it is molded into sheets.

B. Incorporating the reinforcing filler charge (silicic acid)

Powderous silicic acid is incorporated at the beginning of the mixing couple.

This operation is usually time consuming (and thus expensive) and difficult to perform, since the very fine powderous silicic acid has a low bulk density. Furthermore, a high amount of energy is required to destroy and later disperse any agglomerates. Depending on the amounts and type of materials which are used, this operation requires a mixing time from about 3 to 6 minutes in an internal mixer, e.g., a Banbury mixer, and a mixing time of from about 15 to 40 minutes in a roller mixer.

Coprecipitates wherein the silicic acid is present in the form of a rubber-silicic-acid-coprecipitate however exhibit important advantages:
reducing the mixing for about 30 to 75%
reducing the energy costs
avoiding dispersion problems
eliminating dust formation Yet, as far as the other process steps are concerned, e.g., the conditions for preparing the materials, conditions during vulcanization of the mixtures and their compositions, it does not make any difference, whether the silicic acid is used in the form of powderous silicic acid or in the form of a coprecipitate.

C. Molding

Molding is effected by means of compression molding, injection molding or calendering extrusion. The vulcanization can take place in connection with the molding (injection or compression molding) or separately therefrom (extrusion and subsequent vulcanization in a heating tunnel, oven or autoclave.)

D. Vulcanizing

Vulcanizing temperature 50°–200° C. preferably 130°–180° C.

The vulcanizing time may vary from about 30 seconds, e.g., for small pieces prepared by injection molding, to about 10 hours or eventually several days for large pieces, e.g., for vulcanization in an autoclave.

A suitable period of time usually is from about 30 seconds to about 20 minutes.

To further illustrate the present invention, the following non-limitative examples will be given for purposes of illustration only:

EXAMPLE

Preparation of a Silica Latex Master Mixture

A mixture of a styrene-butadiene-rubber (=SBR) latex and a sodium silicate solution was prepared, using a sodium silicate wherein the molar ratio $SiO_2/Na_2O$ was 3.5.

The concentration of the sodium silicate in the mixture was equivalent to 50 grams per liter of $SiO_2$ and 14.5 grams per liter of $Na_2O$. The suspension of SBR latex contained 150 grams per liter of the polymer brought to a concentration of 100 percent and was prepared from a latex containing 20% of dry extract.

The reaction was conducted as follows:

Into a zone reactor first of all 50.1 liters of water were introduced and brought to a temperature of 85° C. This temperature was maintained with accuracy of about ±1° during the entire period while the reagents were introduced.

Continuously and simultaneously a solution of zinc sulfate containing 86.2 grams per liter of $ZnSO_4.7H_2O$, and the above-described mixture was introduced into the reactor.

The total time for introducing the reagents was 60 minutes, and the introduction rate was as follows:
mixture:—1,310 cm$^3$ per minute
solution of zinc sulfate:—940 cm$^3$ per minute The pH is maintained at between 6.0 and 6.5 by modifying the flow rate of the mixture, if necessary.

During the entire period of adding the reagents, the reaction mixture is agitated.

After the addition of the reagents was completed the suspension was allowed to stabilize for about 10 minutes at 95° C. The powderous master batch material was recovered from the suspension by filtration and subsequently washed and then dried. The drying was effected by rapidly bringing the moist mixture into intimate contact with a hot gas in a drying apparatus comprising a tubular casing having an outlet aperture at its downstream end, a coaxial internal pope terminating at a small distance from the outlet, and means for introducing a gas flow into the casing tube around the axial pipe by introducing a continuous rectilinear flow of the moist material through the internal pipe into the flow passage of a helicoidal gas flow, the temperature of which is about 110° C. at the outlet.

The resulting product is obtained in the form of a white powder, which can be readily formulated into a moldable composition.

In order to demonstrate the properties of the compositions, according to the invention, elastomers were prepared from the formulations shown in Table I below which comprised either the master batch obtained according to the example above, or a styrene-butadiene-rubber combined with an equivalent amount of silica and of ZNO, and their physical properties were determined.

In the following Table I the amounts are given in parts by weight:

TABLE I

|  | 1 | 2 | 3 | 4 | 5 | 6 |
|---|---|---|---|---|---|---|
| Styrene-butadiene-rubber (rubber SBR 1509) |  | 100 | 100 |  | 100 | 100 |
| Master mixture obtained according to the example | 148 |  |  | 148 |  |  |
| Active ZnO |  | 12 | 3 |  | 12 | 3 |
| Silica according to the Example |  | 36 | 45 |  | 36 | 45 |
| Stearic acid | 1.00 | 1.00 | 1.00 | 1.00 | 1.00 | 1.00 |
| Mercaptan silane commercially available under the designation A 189 g |  |  |  | 0.70 | 0.70 | 0.70 |
| Antioxidant commercial product: Permanas 49 HV | 2.00 | 2.00 | 2.00 | 2.00 | 2.00 | 2.00 |
| Polyethylene glycol PEG 4000 | 2.50 | 2.50 | 2.75 | 2.50 | 2.50 | 2.75 |

TABLE I-continued

|  | 1 | 2 | 3 | 4 | 5 | 6 |
|---|---|---|---|---|---|---|
| Sulfur | 2.30 | 2.30 | 2.30 | 2.30 | 2.30 | 2.30 |
| Benzothiazyldisulfied MBTS | 0.75 | 0.75 | 0.75 | 0.75 | 0.75 | 0.75 |
| Diphenyl guanidine | 1.50 | 1.50 | 1.50 | 1.50 | 1.50 | 1.50 |

The silica used in the comparative formulations was a silica of the classic type obtained by introducing 79 liters of sulfuric acid of a density d=1,050 into 81 liters of a sodium silicate solution wherein the concentration of sodium silicate is equivalent to 42.9 grams per liter of $Na_2O$ and 145.3 grams per liter of $SiO_2$ during a total reaction period of 58 minutes and wherein the final concentration in $SiO_2$ is 78.9 grams per liter and the final pH is 5.

The elastomers were prepared from the above formulations by the conventional procedure which is known as internal mixture and/or open mill method in a roller mill or a mixer of the Banbury or Werner type.

The following tests were especially designed to show the influence of substituting the master batch according to the invention for a rubber containing an equivalent amount of silica and of ZnO in formulations containing a silane as coupling agent as well as in formulation without silane.

The following parameters were determined on the vulcanized elastomer.

first of all, the rheologic, static, and dynamic properties, then the behavior under heating in a Goodrich flexometer, finally the degree of dispersion of the filler throughout the vulcanized substance.

The rheologic properties have been measured according to the procedures of the "Continuous Measurement of the Cure Rate of Rubber", ASTM Special Technical Publication No. 383.

The static properties have been determined according to the following standard procedures:

| Rebond | DIN 53512 |
|---|---|
| Tensile strength | NF T 46 002 |
| Corresponding elongation | Test tube A$_1$ |
|  | NF T 46 002 |
|  | Test tube A$_1$ |
| Shore hardness | ASTM 676-58 T |
|  | (Instant reading) |
| Modules at 300%, 100% | AFNOR NF T 46 002 |
| 50% | Test tube A$_1$ |
| Abrasion | ASTM D 394-47 |
| Tear strength |  |
| angular (Test tube C) | ASTM D 624-54 |
| cleft tear | AFNOR NF 47-126 |
| Permanent deformation by compression (compression set) | ASTM D 395-55 method B |

The dynamic properties have been determined according to the methods described by A. Voet and J. C. Morawski in *Rubber Chemistry and Technology*, 47 4 (1974) 758-777, and the report at the end of the study to the General Delegation to Scientific and Technical Research No. 73-7-1151.

The test conditions in a Goodrich flexometer were as follows:
initial temperature of the chamber: 50° C.
charge: 11 kilograms
amplitude: 0.4 centimeter The degree of dispersion was evaluated as follows: the vulcanized substance charged with silica was cut into slices of a few microns of thickness, then the slices were stained preferably with methyl red in order to make the filler visible by optical microscopy, since in the unstained material the filler has the same index of refraction as the elastomer.

The percentage of dispersion is calculated as the percentage of filler material dispersed in the form of conglomerates of less than 8 microns. This percentage is calculated as follows:

$$\text{Percent dispersion} = 100 - \frac{SX}{L}$$

X = the total number of squares of 17 microns length within the reticule containing a total number of 100,000 squares, which are covered more than half by the conglomerates
S = surface swelling factor due to the action of the swelling agent
that is:

$$S = \frac{\text{surface of the cut after swelling}}{\text{surface of the cut before swelling}}$$

L = percentage by the volume of filler relative to the total amount of the elastomer $$= \frac{\text{weight of filler} \times \text{specific volume of filler} \times 100}{\text{weight of the mixture} \times \text{specific volume of the mixture}}$$

It is then assumed that if the % dispersion value is higher than 98%, the dispersion is good; if it is between 95 and 98%, it is medium; between 90 and 95%, it is acceptable; and below 90% it is poor.

The results obtained are summarized in Table II below.

TABLE II

| Elastomer Formulation No. Properties | 1 | 2 | 3 | 4 | 5 | 6 |
|---|---|---|---|---|---|---|
| Composition | | | | | | |
| VARIABLES | | | | | | |
| Coprecipitate SBR | 100 | | | 100 | | |
| SiO₂, H₂O | 36 } 48 | | | 36 } 48 | | |
| ZnO | 12 | | | 12 | | |
| SBR | — | 100 | 100 | — | 100 | 100 |
| Silica for comparison | — | 36 } 48 | 45 } 48 | — | 35 } 48 | 45 } 48 |
| Active ZnO | — | 12 | 3 | — | 12 | 3 |
| Mercapto-silane (=Silane A 189, 2% on silica) | — | — | — | 0.72 | 0.72 | 0.90 |
| Monsanto rheometer at 150° C. | | | | | | |
| Minimal torque (cm) | 16 | 10 | 17 | 15 | 11 | 15 |
| Maximal torque (cm) | 90 | 80 | 93 | 94 | 88 | 91 |
| Δ torque | 74 | 70 | 76 | 79 | 77 | 76 |
| Scorch time (+ 2 points) in minutes | 4.25 | 3.75 | 4.50 | 3.25 | 2.00 | 2.25 |
| Speed of Vulcanization in minutes | 16.75 | 7.75 | 7.25 | 16.26 | 7.75 | 8.75 |
| Optimum cure time, in minutes | 21.00 | 11.50 | 11.75 | 19.50 | 9.75 | 11.00 |
| Static Properties | | | | | | |
| Rebond in percent | 31 | 36 | 32 | 33 | 38.5 | 34.5 |
| Tensile strength | 186 | 158 | 173 | 215 | 169 | 216 |
| Elongation at break % | 630 | 635 | 640 | 570 | 540 | 610 |
| Shore hardness A | 73 | 62 | 69 | 73 | 63 | 69 |
| Module at 50% elongation All in kilogram per square centimeter | 15 | 12 | 12 | 16 | 15 | 15 |
| Module at 100% elongation | 18 | 16 | 16 | 20 | 20 | 20 |
| Module at 300% elongation | 33 | 32 | 30 | 85 | 63 | 61 |
| Module + elongation/10 | 96 | 95.5 | 94 | 142 | 117 | 122 |
| Tear strength angular tear Kg/cm | 41 | 34 | 36 | 53 | 45 | 50 |
| Tear strength cleft-form tearing | 22 | 8.5 | 17 | 18 | 9.6 | 17.5 |
| Permanent deformation under compression (compression set) | 32 | 32 | 45 | 26 | 29 | 34 |
| Abrasion (loss cm3/cv/H, power index (IE) | 550 | 470 | 525 | 490 | 420 | 440 |
| Volumetric abrasion index (IV) | 1.94 | 1.61 | 1.59 | 1.54 | 1.30 | 1.39 |
| Density | 1.20 | 1.19 | 1.18 | 1.20 | 1.19 | 1.18 |
| Dynamic Properties | | | | | | |
| METRAVIB viscoelastomer E' 10% (x) 10⁻⁷ N/m² | | | | | | |

TABLE II-continued

| Elastomer Formulation No. Properties | 1 | 2 | 3 | 4 | 5 | 6 |
|---|---|---|---|---|---|---|
| (elastic module) | 1.28 | 0.77 | 0.96 | 1.14 | 0.74 | 1.05 |
| E" 10% $10^{-7}$ N/m$^2$ (viscous module) | 0.22 | 0.115 | 0.14 | 0.16 | 0.080 | 0.16 |
| E"/ (E$^x$) 10% $10^{+7}$ (complaisance) | 0.13 | 0.19 | 0.15 | 0.12 | 0.15 | 0.14 |
| Tg δ 10% (tangent of the loss angle) | 0.17 | 0.15 | 0.15 | 0.14 | 0.11 | 0.15 |
| GOODRICH FLEXOMETER Static charge 11 kilograms (24 pounds) Dynamic deflection 22.4% Frequency 23.8 cycles per second Temperature of the chamber 50° C. | | | | | | |
| (CS) Static compression in % | 10.05 | 14.4 | 12 | 10.50 | | |
| (DP) Permanent deformation in % | 19.0 | 4.6 | 9.5 | 5.2 | | |
| (CDI) Initial dynamic compression | 3.6 | 5.26 | 5.0 | 1.15 | | |
| (CDF) Final dynamic compression | 27.5 | 11.00 | 14.3 | 5.60 | | |
| Δ CDF - CDI % | 17.9 | 5.75 | 9.3 | 4.45 | | |
| Heating aΔ T base (pallier) | 67 | 44 | 54 | 39 | | |
| Δ T heart (pallier) | 150 (1) | 136 | 150 (2) | 138 | | |
| Dispersion | good | medium | medium | good | medium | medium |

(Note: x) Elastic module measured at 20° C., 7.8 cycles per second and for a sinusoidal deformation of 10%.
(1) = very superior
(2) = superior to It is noted that in the case of both the mixtures according to the present invention, a good dispersion is observed whereas the dispersion of the same added quantity of silica and zinc in the comparative composition is only medium.

In this example the properties of the vulcanized coprecipitate 1 are equal to those of comparative vulcanized material, with an improvement of the mechanical properties at the stress limits (tensile strength, tear strength) and an excellent permanent deformation at compression (compression set).

With regard to the dynamic properties a low heating and a high hystereiss are known to be generally desirable properties. A heating which is still relatively high and a high hystereiss of the coprecipitate are observed.

It is surprising that the addition of mercapto-silane makes it possible at the same time to reduce considerably the heating of the coprecipitate and to maintain a high hysteresis.

The properties of an elastomer containing the master batch prepared by coprecipitation according to the invention were also compared with those of an elastomer containing another comparative mixture which was not prepared according to the present invention.

This comparative mixture was a comixture which was obtained by dispersing the charge in the form of a cake in the latex and then in coagulating the latex by acidification.

A co-mixture which contained the same concentration of charge as the preceding mixtures was prepared.

For information purposes the results of the comparative tests performed with the elastomer containing the coprecipitate and the elastomer containing the comixture are given in Table III below:

TABLE III

| | Coprecipitate | Comixture |
|---|---|---|
| Monsanto rheometer at 150° C. | | |
| Minimal torque (Cm) | 16 | 8 |
| Maximal torque (CM) | 90 | 85 |
| Δ Couple torque | 74 | 77 |
| Precocity scorch time | 4.25 | 6.25 |
| Speed of vulcanization | 16.75 | 8.50 |
| Optimum cure time | 21 | 14.75 |
| Static properties | | |
| Tensile strength | 186 | 167 |
| Shore A hardness | 73 | 66 |
| Module 100% | 15 | 12 |
| Module 200% | 18 | 17 |
| Module 300% | 33 | 36 |
| Elongation in % | 630 | 625 |
| Tear strength, angular strength | 41 | 33 |
| Tear strength, cleft-form tear | 22 | 11 |
| Rebond in % | 31 | 36.5 |
| Compression set | 32 | 28 |
| Abrasion (IE) | 550 | 525 |
| Abrasion (IV) | 1.94 | 1.67 |
| Dispersion | Good | Medium |
| Dynamic Properties | | |
| METRAVIB Viscoelastometer | | |
| E' 10% | 1.28 | 1.26 |
| E" 10% | 0.22 | 0.354 |
| E"/ (E$^x$)$^2$ | 0.13 | 0.206 |
| tg δ | 0.17 | 0.281 |
| Goodrich flexometer | | |
| CS - static compression in % | 10.05 | 14 |
| DP - Permanent deformation in % | 19 | 7.5 |
| CDI | 3.6 | 5.1 |
| CDF | 27.5 | 13.2 |
| CDF - CDI | 17.9 | 8.1 |
| Δ T base | 67 | 49 |
| Δ T heart (1) very superior to (2) superior to | 150 (1) | 150 (2) |

The comixture leads to poorer results with regard to the mechanical properties (tensile strength—10%, hardness—7 points and cleft-form strength—15 %), and with regard to dispersion as compared with the results obtained by using the coprecipitate.

It can be seen that the mixture according to the present invention shows unexpectedly better results with regard to the degree of dispersion and mechanical properties, as compared with the results obtained by using known procedures of incorporation of the charge in an elastomer.

While the invention has now been described in terms of various preferred embodiments, and exemplified with respect thereto, the skilled artisan will appreciate that various substitutions, changes, omissions, and modifications may be made without departing from the spirit thereof. Accordingly, it is intended that the scope of the invention be limited solely by that of the following claims.

What is claimed is:

1. A process for preparing a polymeric composition comprising a polymeric material containing finely dispersed therein a water insoluble inorganic silicate comprising the steps of
    (a) feeding a stream of an aqueous mixture containing a coagulable latex dispersion of a polymeric material and an aqueous solution of a water soluble alkali silicate into a reactor simultaneously with a separate stream of an aqueous solution containing at least one water soluble bivalent metal salt selected from the group consisting of chlorides and sulfates of a bivalent metal cation selected from the group of zinc, magnesium and calcium cation, to form a reaction slurry the pH of which is constantly maintained at such a value as is appropriate for precipitating a substantially neutral silicate of said bivalent metal by reaction of stoichiometrically equivalent amounts of the alkali silicate and the bivalent metal salt yet at which the precipitation of any hydroxy salt of the bivalent metal cation and of any alkali silicate is substantially prevented thereby maintaining a sufficiently elevated reaction temperature to effect the precipitation of the neutral bivalent metal silicate and the coagulation of the polymeric material to form a suspension of particles of said organic polymeric material having said bivalent metal silicate associated therewith, and
    (b) recovering said particles from said suspension.

2. The process as defined in claim 1 wherein the reaction temperature is in the range from about 40° to about 90° C.

3. The process as defined in claim 1 wherein the bivalent metal salt is a zinc salt and the pH value of the reaction slurry is from about 6.0 to about 6.5.

4. The process as defined in claim 1 wherein the bivalent metal salt is a magnesium salt and the pH value of the reaction slurry is from about 8.0 to about 9.5.

5. The process as defined in claim 1 wherein the bivalent metal salt is a calcium salt and the pH value of the reaction slurry is from about 8.5 to about 10.0.

6. The process as defined in claim 1 wherein the amounts of alkali silicate in the mixture and of bivalent metal salt in the solution and feeding rate of the two separate streams are adjusted such that substantially stoichiometrically equivalent amounts of alkali silicate and bivalent metal salt are simultaneously introduced into the reactor.

7. The process as defined in claim 1, wherein said streams are simultaneously introduced into water contained in said reactor.

8. The process as defined in claim 1, wherein said streams are simultaneously introduced into an aqueous electrolyte solution.

9. The process as defined in claim 8, wherein the electrolyte comprises a salt the anion of which is that of the bivalent metal salt.

10. The process as defined in claim 1 which further comprises adding to the reaction mixture an acid the anion of which is that of the bivalent metal salt.

11. The process as defined in claim 1 wherein the polymeric material comprises a styrene-butadiene-rubber.

12. The process as defined in claim 1 wherein the alkali silicate comprises a sodium silicate wherein the molar ratio $SiO_2/Na_2O$ is from about 2 to about 3.5.

13. The process as defined in claim 1 wherein the amount of alkali silicate in the alkali silicate solution is equivalent to a content of from about 25 to about 75 g/l of $SiO_2$.

14. The process as defined in claim 1 wherein the amount of polymer in the latex dispersion is from about 75 to about 250 g/l.

15. A plastic composition comprising a polymeric organic compound containing finely dispersed therein at least bivalent metal silicate the bivalent metal being selected from the group consisting of zinc, calcium, and magnesium, the plastic composition being substantially free of any hydroxy salt of the bivalent metal and of any alkali silicate, obtained according to the process as defined in claim 1.

16. A vulcanizable polymeric composition comprising a master batch composition as defined in claim 15 and a vulcanizing agent.

17. The vulcanizable polymeric composition as defined in claim 16 further comprising a mercaptosilane.

18. An elastomer obtained by vulcanizing the composition as defined in claim 16.

19. A plastic composition comprising a polymeric organic compound containing finely dispersed therein at least bivalent metal silicate the bivalent metal being selected from the group consisting of zinc, calcium and magnesium, the plastic composition being substantially free of any hydroxy salt of the bivalent metal and of any alkali silicate, obtained according to the process as defined in claim 6.

20. A vulcanizable polymeric composition comprising a master batch composition as defined in claim 19 and a vulcanizing agent.

21. The vulcanizable polymeric composition as defined in claim 20 further comprising a mercaptosilane.

22. An elastomer obtained by vulcanizing the composition as defined in claim 20.

* * * * *